(12) United States Patent
Zhao et al.

(10) Patent No.: US 11,781,420 B2
(45) Date of Patent: Oct. 10, 2023

(54) DISPLACEMENT MEASURING DEVICE AND SPEED MEASURING METHOD OF DRILLING TRACTION ROBOT

(71) Applicant: SOUTHWEST PETROLEUM UNIVERSITY, Chengdu (CN)

(72) Inventors: Jianguo Zhao, Chengdu (CN); Qingyou Liu, Chengdu (CN); Haiyan Zhu, Chengdu (CN); Guorong Wang, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 106 days.

(21) Appl. No.: 17/387,956

(22) Filed: Jul. 28, 2021

(65) Prior Publication Data

US 2022/0307367 A1   Sep. 29, 2022

(30) Foreign Application Priority Data

Mar. 25, 2021  (CN) .......................... 202110316450.1
Mar. 25, 2021  (CN) .......................... 202110316464.3

(51) Int. Cl.
| | | |
|---|---|---|
| *G01D 5/14* | (2006.01) | |
| *E21B 47/01* | (2012.01) | |
| *E21B 47/26* | (2012.01) | |
| *E21B 23/00* | (2006.01) | |
| *E21B 47/06* | (2012.01) | |
| *E21B 7/04* | (2006.01) | |

(52) U.S. Cl.
CPC ............ *E21B 47/01* (2013.01); *E21B 23/001* (2020.05); *E21B 47/26* (2020.05); *G01D 5/14* (2013.01); *E21B 7/046* (2013.01); *E21B 47/06* (2013.01)

(58) Field of Classification Search
CPC ........ E21B 47/01; E21B 23/001; E21B 23/00; E21B 47/26; E21B 7/046; E21B 7/04; E21B 47/06; G01D 5/14; G01D 5/145; G01D 5/48; G01P 3/00
See application file for complete search history.

(56) References Cited

U.S. PATENT DOCUMENTS

| | | |
|---|---|---|
| 10,444,360 B2 | 10/2019 | Kondo et al. |
| 2012/0068066 A1 | 3/2012 | Hayashi et al. |
| 2019/0265020 A1 | 8/2019 | Noda et al. |

FOREIGN PATENT DOCUMENTS

| | | |
|---|---|---|
| CN | 109682626 A | 4/2019 |
| CN | 210893349 U | 6/2020 |

*Primary Examiner* — Tarun Sinha
*Assistant Examiner* — James I Burris

(57) ABSTRACT

The invention relates to a displacement measuring device and a velocity measuring method of a drilling traction robot. The measuring device comprises a support bar, a stopper, a hydraulic, a piston of the hydraulic, a displacement sensor, a seal baffle, a waveguide, a magnetic ring, and a magnetic ring support plate. The invention can realize instant measurement and instant feedback of the velocity of the drilling traction robot and can provide data reference for automatic drilling of the drilling traction robot.

11 Claims, 10 Drawing Sheets

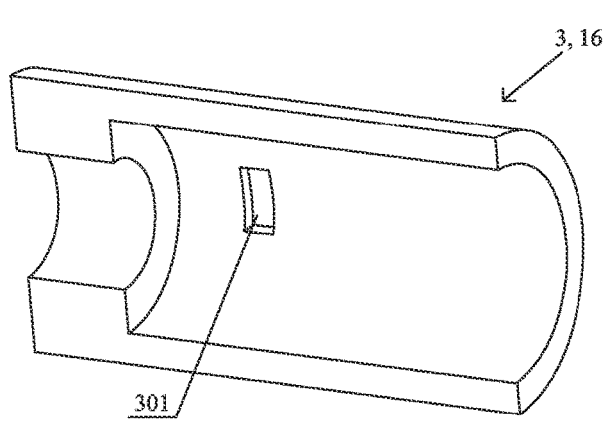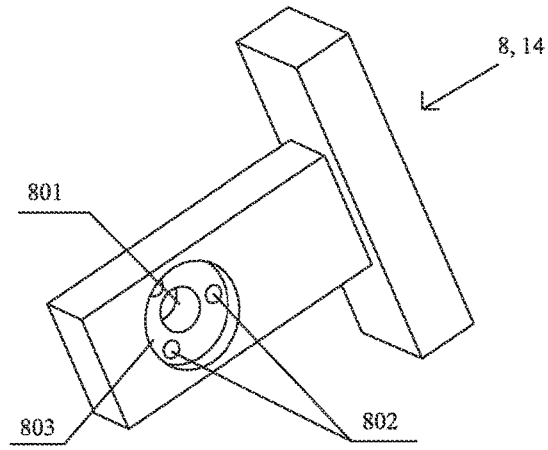
FIG. 4
FIG. 5

DISPLACEMENT MEASURING DEVICE AND SPEED MEASURING METHOD OF DRILLING TRACTION ROBOT

CROSS-REFERENCE TO RELATED APPLICATIONS

This application claims foreign priority of Chinese Patent Application No 202110316464.3 with a filing date of Mar. 25, 2021, Chinese Patent Application No. 202110316450.1 with a filing date of Mar. 25, 2021 in the China National Intellectual Property Administration, the disclosures of all of which are hereby incorporated by reference.

TECHNICAL FIELD

The present invention relates to the field of underground robots, and, more particularly, to a displacement measuring device and a velocity measuring method of a drilling traction robot.

BACKGROUND

In order to improve the comprehensive economic benefits of unconventional oil and gas exploration such as shale gas, extended reach horizontal wells are increasingly favored in China and abroad. Therefore, it is of great strategic significance to carry out research on efficient, safe and rapid well construction technologies for long horizontal section chilling to alleviate the contradiction between energy supply and demand in China and promote the scientific development of economy and society. However, with the increase of displacement in the horizontal section of the horizontal well, the friction resistance of a drill string increases, and the drill string is extremely easy to "support the pressure", which causes abnormal difficulty in loading a bit pressure, significantly increases a well construction period, reduces the comprehensive economic benefits of oil and gas development, and hinders the long-term development of unconventional oil and gas such as shale gas. Using an underground robot to pull the drill string can effectively solve the problem of excessive friction resistance, and meanwhile, can provide a rock breaking weight for the drill bit, and can realize intelligent closed-loop drilling.

At present, the drilling traction robot still stays in the aspect of theoretical research, and no field test or application report has been seen yet. Automation and intelligence of the drilling traction robot have not yet been effectively breakthrough. However, the acquisition of drilling information by the robot is the most important and direct method to realize the automation and intelligence of the drilling traction robot. In terms of measuring a drilling velocity of the drilling traction robot, there is no reliable and real-time measurement device for downhole drilling. In the automatic velocity control of the drilling traction robot, the acquisition, adjustment and feedback of the velocity directly determine the important conditions of automation and intelligence of the drilling traction robot. CN201380006317.3 and CN201780047640.X have been invented currently.

Patent CN201380006327.3 uses drilling data based on a drill floor and top drive drilling data to complete the calculation of the drilling velocity. Although the requirements on sensor sealing conditions are low, data is easy to acquire and the device is simple data can only be calculated indirectly and accurate data cannot be obtained directly.

Patent CN 01760047640.X: adopts top rotating driving velocity and top driving velocity to calculate a downhole velocity and a downhole torque according to damping characteristics of a wellbore drilling device which is easy to implement, but is still based on theory and formula, has a large error, and has a time delay.

The two patents only indirectly measure the downhole drilling rate through data of a surface rotation system, and cannot obtain direct and instant drilling displacement and velocity data, and cannot immediately complete the instant data transmission and feedback t a downhole drilling traction robot. The existing drilling traction robot cannot provide experimental data support for automatic control of the velocity of the drilling traction robot, which is an important reason why the current drilling traction robot cannot realize the automatic control of the velocity. Therefore, it is necessary to invent a device capable of measuring the velocity of the drilling traction robot to provide a data reference for the automation of the drilling traction robot, thereby promoting the application of the drilling traction robot and the exploitation of unconventional oil and gas such as shale gas.

SUMMARY

The present invention aims at overcoming the defects of the prior art and providing, a displacement measuring, device of a drilling traction robot.

The displacement measuring device of the drilling traction robot comprises a support bar (1), a stopper (2), a hydraulic A (3), a hydraulic B (16), a piston (4) of the hydraulic A, a piston (10) of the hydraulic B, a displacement sensor A (5), a displacement sensor B (11), a seal baffle A (6), a seal baffle B (12), a waveguide A (7), a waveguide B (13), a magnetic ring A (9), a magnetic ring B (15), a magnetic ring support plate A (8), a magnetic ring support plate B (14), a computer (17) and a drilling traction robot (18).

the hydraulic A (3), the hydraulic B (16), the piston (4) of the hydraulic A and the piston (10) of the hydraulic B are coaxially arrange on the support bar (1); the piston (4) of the hydraulic A is mounted in a cavity a (19) between, the hydraulic A (3) and the support bar (1); and the piston (10) of the hydraulic B is mounted in a cavity b (20) between the hydraulic B (16) and the support bar (1), wherein the piston (10) of the hydraulic B is fixedly connected with the support bar (1);

the magnetic ring A (9) and the magnetic ring support plate A (8) are fixedly connected through a screw, wherein the in magnetic ring support plate A (8) is fixedly connected with the hydraulic A (3) through a sere the seal baffle A (6) is connected with the displacement sensor A (5) through a thread, wherein the seal baffle (6) and the piston (4) of the hydraulic A are fixed through a glue stick; and the stopper (2) is mounted in a thread mode at a motion limiting position of the piston (4) of the hydraulic A to realize a displacement measuring function between the hydraulic A (3) and the piston (4) of the hydraulic A; and the magnetic ring B (15) and the magnetic ring support plate B (14) are fixedly connected through a screw, wherein the magnetic ring support plate B (14) is fixedly connected with the hydraulic B (16) through a screw; and the seal baffle B(12) is connected with the displacement sensor B (11) through a thread, wherein the seal baffle B (12) and the piston (10) of the hydraulic B are fixed through a glue stick to realize a travelling displacement measuring function of the robot between the hydraulic B (16) and the piston (10) of the hydraulic B.

Two to four mounting groove (301) which are uniformly distributed in a circumferential direction are arranged on inner cylinder walls of the hydraulic A (3) and the hydraulic B (16).

A countersunk hole (803) is milled on the magnetic ring support plate A (8) and the magnetic ring support plate B (14), a through hole (801) is arranged at a center of the countersunk hole), and two to four threaded holes (802) are uniformly and circumferentially arranged along an outside radial direction of the through hole (801).

The seal baffle A (6) and the seal baffle B (12) are both provided with a seal threaded hole (601) at a centers and two to four axial symmetrical through holes (602) are arranged in a radial direction.

The piston (4) of the hydraulic A and the piston (10) of the hydraulic B are both provided with two to four circular countersunk holes (401) which are axially symmetrical with a through hole (404) in an external structure, a center of the circular countersunk hole (401) is provided with a through hole (402), and two to four threaded holes (403) which are uniformly distributed are arranged in a radial direction: and an inside of the piston (10) of the hydraulic B is provided with an arc-shaped groove (1001): and an axial long groove is arranged in the piston (4) of the hydraulic A.

A through hole (101) is axially arranged in the support bar (1), and a through hole (103) and a threaded hole (102) are radially arranged in the support bar (1).

The displacement sensor A (5) and the displacement sensor B (11) are both magnetic displacement sensors, the displacement sensor A (5) is connected with the seal baffle A (6) through a thread so as to be fixed on the piston (4) of the hydraulic A, and the magnetic ring A (9) of the displacement sensor A (5) is fixed on the magnetic ring support plate A (8) through a glue stick or a screw, the displacement sensor B (11) is fixed on the seal baffle B (12) through a thread so as to be fixed on the hydraulic piston (10) of the hydraulic B, and the magnetic ring B (15) of the displacement sensor B (11) is fixed on the magnetic ring support plate B (14) through a glue stick or a screw.

The present invention also provides a velocity measuring method of a drilling traction robot, winch comprises the following steps S1: assembling a drilling traction robot (18) on the ground and testing, and calibrating, by a computer (17), data collected by a sensor A (5) and a sensor B (11) to zero;

S2: inputting a bit pressure FP in the computer (17);

S3: putting the drilling traction robot (18) into a ell and starting drilling when a pressure detector D detects that the drilling traction robot (18) contacts a bottom of the well;

S4: starting to record, by the computer (17), data ($L_{A1}$, $L_{A2}$, $L_{A3}$) of the displacement sensor A (5) and data ($L_{B1}$, $L_{B2}$, $L_{B3}$) of the displacement sensor B (11);

S5: filtering, the computer (17), the data ($L_{A1}$, $L_{A2}$, $L_{A3}$) of the displacement sensor A (5) and the data ($L_{B1}$, $L_{B2}$, $L_{B3}$) of the displacement sensor B (11);

S6: processing and deriving, by the computer (17), the filtered data ($L_{A1}$, $L_{A2}$, $L_{A3}$) of the displacement sensor A (5) and the filtered data ($L_{B1}$, $L_{B2}$, $L_{B3}$) of the displacement sensor B (11) to obtain velocitys $V_{tA}$ and $V_{tB}$; and S7: after the drilling is completed, tripping out acid extracting the velocity and displacement data from the computer (17).

The collecting process of the pressure detector D comprises the following steps of:

S31: mounting the pressure detector D at a rear pant of a drill bit (21), or a part fixedly connected with the drill bit (21); and S32: when the pressure data collected by the pressure detector D is continuously higher than a certain set value, deeming that the drill bit (21) reaches the bottom of the well and starting drilling, which means to transmit a signal to the computer (17).

The displacement sensor (5), and the displacement sensor B comprise the following technical features:

the displacement sensor A (5) and the displacement sensor B (11) are respectively provided with three positions which are axially symmetrical with a through hole (404);

when a hydraulic A (3) begins to move, the hydraulic A (3) is fixedly connected with a magnetic ring A (9) to drive the magnetic ring A (9) to move along a waveguide A (7), so that the displacement sensor A (5) measures movement displacement data ($L_{A1}$, $L_{A2}$, $L_{A3}$) of a piston (4) at an A part of the drilling traction robot; and when a hydraulic, B (16) begins to move, the hydraulic B (16) is fixedly connected with a magnetic ring B (15) to drive the magnetic ring B (15) to move along a waveguide B (13), so that the displacement sensor B (11) measures displacement data (B1, B2 and B3) of a piston (10) at a B part of the drilling traction robot.

Further, the method comprises the steps of S61: sorting, by the computer (17), the three data ($L_{A1}$, $L_{A2}$, $L_{A3}$) inputted from the displacement sensor A (5), and inputting the sorting result into a formula $L_t=(L_1+4L_2+L_3)/6$ to obtain displacement data $L_{tA}$, wherein a data processing method of the sensor B is the same as that of the displacement sensor A (5);

S62: performing, by the computer (17), continuous function interpolation processing on the processed displacement data $L_{tA}$ and $L_{tB}$ by an interpolation method;

S63: deriving, by the computer (17), $$V_t = \frac{\Delta L_t}{\Delta t}$$

on, the processed data $L_{tA}$ of the displacement sensor A (5) to obtain the movement velocity $V_{tA}$ of a piston (4) at a part A of the drilling traction robot; and S64: deriving, by the computer (17), $$V_t = \frac{\Delta L_t}{\Delta t}$$

on the processed data $L_{tB}$ of the displacement sensor B (11) to obtain the in movement velocity $V_{tB}$ of a piston (10) at a B part of the drilling traction robot.

The present it has the following advantages: the present invention belongs to a velocity measuring device of a drilling traction robot, and the measuring device is simple with stable measuring result and low cost. The velocity measuring method of the drilling traction robot according to the present invention has the advantages of simple measurement mode, small error and low cost. On the basis of the velocity measuring device and the velocity measuring method of the drilling traction robot, instant measurement and instant feedback of the velocity of the drilling traction robot can be realized, and a data reference can be provided for automatic drilling of the drilling traction robot, so as to promote application of the drilling traction robot, and exploitation of unconventional oil and gas such as shale.

BRIEF DESCRIPTION OF THE DRAWINGS

FIG. 4 is a schematic diagram of a cylinder wall mounting structure of the hydraulic cylinders in FIG. 1 and FIG. 2;

FIG. 5 is a schematic diagram of magnetic ring support plates in FIG. 1 and FIG. 2;

Figure 1:
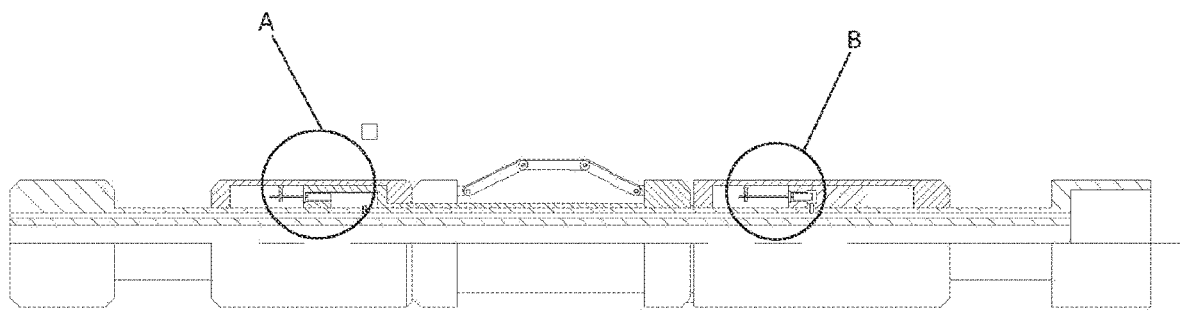
FIG. 1 is a structural diagram of a displacement measuring system of a drilling traction robot.
Figure 2:
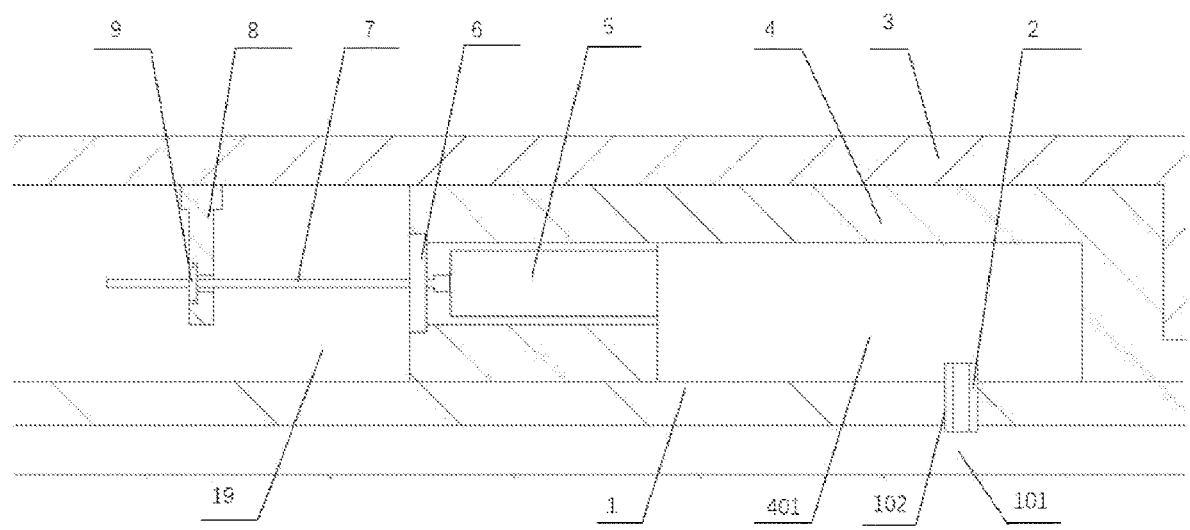
FIG. 2 is a structural diagram of a gripper translation hydraulic cylinder, which is a detailed structure of part A in FIG. 1.
Figure 3:
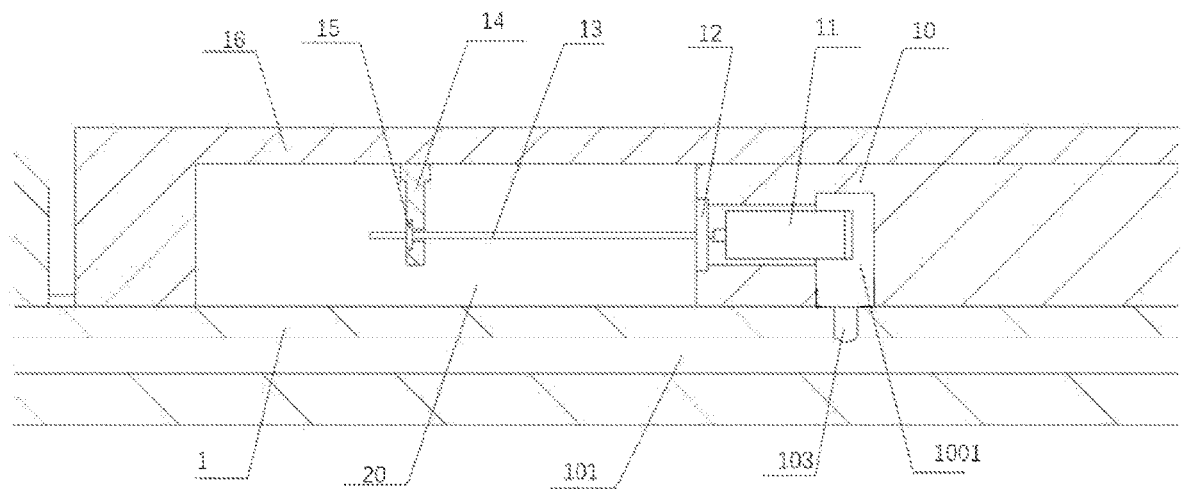
FIG. 3 is a structural diagram of a robot traveling hydraulic cylinder, which is a detailed structure of part B in FIG. 1.
Figure 6:
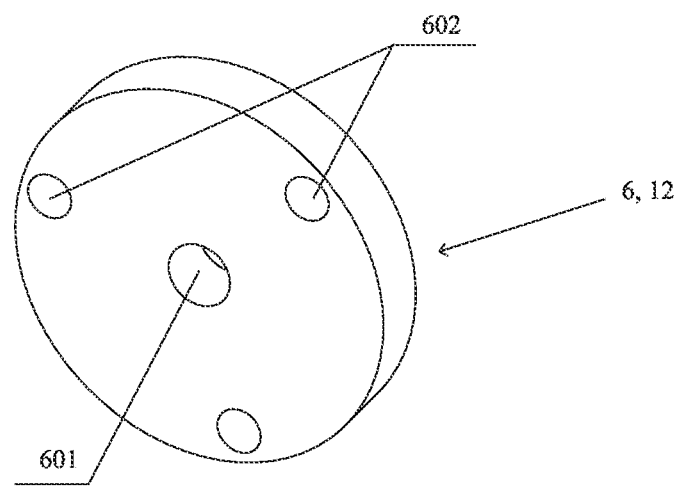
FIG. 6 is a schematic diagram of seal baffles in FIG. 1 and FIG. 2.

In the drawings: 1 refers to support bar, 2 refers to stopper, 3 refers to hydraulic A, 4 refers to position of hydraulic A, 5 refers to displacement sensor A, 6 refers to seal baffle A, 7 refers to waveguide A, 8 refers to magnetic ring support plate A, 9 refers to magnetic ring A, 10 refers to piston of hydraulic B, 11 refers to displacement sensor B, 12 refer to seal baffle B, 13 refers to waveguide B, 14 refers to magnetic ring support plate B, 1 refers to magnetic ring B, 1 refers to hydraulic B, 17 refers to computer, 18 refers to drilling traction robot, 19 refers to cavity a, 20 refers to cavity b, 21 refers to drill bit, 101 refers to through hole 1001 refers to arc-shaped groove, 102 refers to threaded hole, 103 refers to through hole, 301 refers to mounting groove, 401 refers to countersunk hole, 402 refers to mounting hole, 403 refers to threaded hole, 404 refers to through hole, 601 refers to through hole, 602 refers to mounting hole 801 refers to through hole, 802 refers to mounting hole, and 803 refers to countersunk hole.

DETAILED DESCRIPTION

The present invention will be further described in detail hereinafter with reference to the drawings, but the protection scope of the present invention is not limited to the following descriptions.

The object of the present invention is to provide displacement measuring device of a drilling traction robot to make up a gap in the prior art. In order to make the above objects, features and advantages of the present invention be understood more clearly, the present invention will be described in further detail below with reference to the drawings and detailed description.

As shown in FIGS. 1 to 7 after a drilling traction robot is completely mounted on the ground, the drilling traction robot is descended into a well and drill. After drilling, displacement data is extracted from the drilling traction robot (18).

The specific steps of mounting the displacement sensors pare as follows: a magnetic ring B (15) is mounted on a mounting countersunk hole (803) of a magnetic ring support plate B (14) by a screw, a magnetic ring A (9) is mounted on a mounting countersunk hole (80) of a magnetic ring support plate A (8) by a screw, and then a seal baffle A (6) is threaded on a waveguide A (7), and mounted on a displacement sensor A (5) through a mounting screw, a seal baffle B (12) is threaded on a waveguide B (13) and mounted on a displacement sensor B (11) through a mounting thread, data lines of the displacement sensor A (5) and the displacement sensor B (11) are connected on a computer (17) of the drilling, traction robot (18) through a through hole (101), and then the waveguide A (7) is penetrated into a through hole (801) of the magnetic ring support plate A (8), and the waveguide B (13) is penetrated into a through hole (801) of the magnetic ring support plate B (14), then the seal baffle A (6) is mounted in a mounting countersunk hole (401) of a piston (4), the magnetic ring support plate B (14) is mounted in a mounting countersunk hole (401) of a piston (10) through a glue stick, and finally, the magnetic ring support plate B (14) is mounted in a mounting groove (301) of a hydraulic B (16) through a screw, and the magnetic ring support plate A (8) is mounted in a mounting groove (301) of a hydraulic A (3) through a screw.

A velocity measuring method of a drilling traction robot a cording to the present invention is approximately as follows:

step 1: assembling a drilling traction robot (18) on the ground and testing, and calibrating, by a compute (17), data collected by a sensor A (5) am d a sensor B (11) to zero;

step 2: inputting a bit pressure FP in the computer (17);

step 3: putting the drilling traction robot into a well and starting drilling; and step 4: after the drilling is completed, tripping, out and extracting the velocity and displacement data from the computer (17).

The pressure detector D should be mounted at a drill bit or a position fixedly connected with the drill bit, to ensure that the pressure detector can detect that the drill bit reaches a bottom of the well: when the data collected by the pressure detector D is continuously higher than a certain set value, it is deemed that the drill bit reaches the bottom of the well and drilling is started, which means to transmit a signal to the computer (17).

The specific principle is as follows: when the hydraulic A (3) begins to move, the hydraulic A (3) is fixedly connected with the magnetic ring A (9) to drive the magnetic ring A (9) to move along the waveguide A (7) with the moving of the hydraulic. A (3), so that the displacement sensor A (5) measures displacement of the magnetic ring A (9), thus obtaining, the relative movement displacement data of the piston (4) and the hydraulic A (3) at an A part of the drilling traction robot.

Same as the method of obtaining the relative movement displacement data of the piston (4) and the hydraulic A (3) at the A part of the drilling traction robot, a method of measuring relative movement displacement data of the piston (10) and the hydraulic B (16) at a B part of the drilling traction robot is as follows: when the hydraulic B (16) begins to move, the hydraulic. B (16) is fixedly connected with the magnetic ring B (15) to drive the magnetic ring B (15) to move along the waveguide B (13) with the moving of the hydraulic B (16), so that the displacement sensor B (11) measures displacement of the magnetic ring B (15), thus obtaining the relative movement displacement data of the piston (10) and the hydraulic B (16) at the B part of the drilling traction robot.

Figure 7:
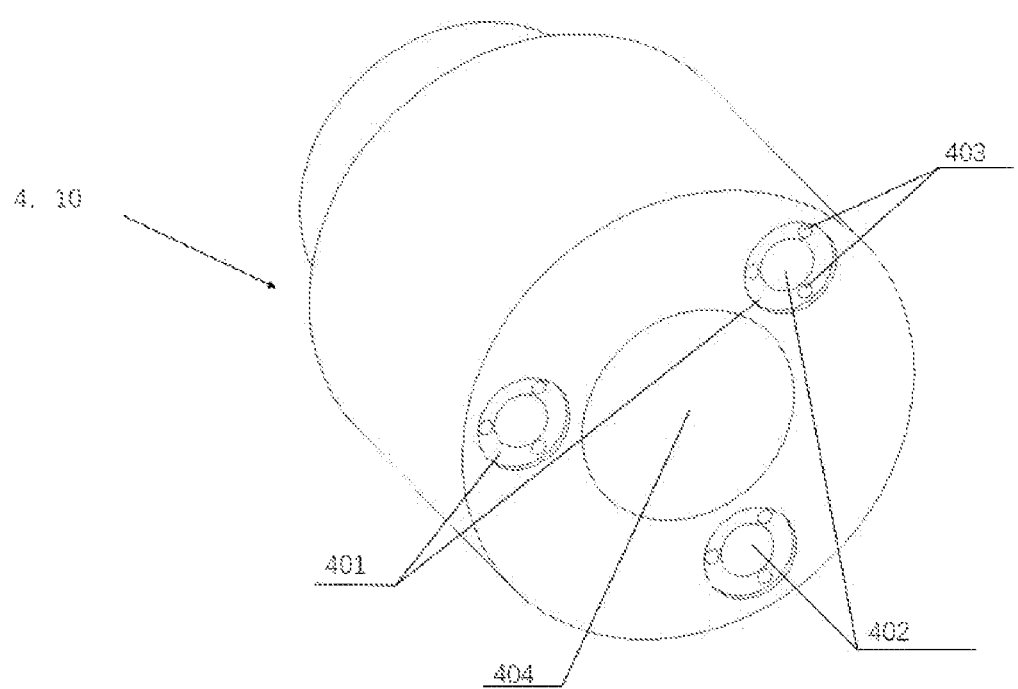
FIG. 7 is a schematic diagram of pistons in FIG. 1 and FIG. 2.
Figure 8:
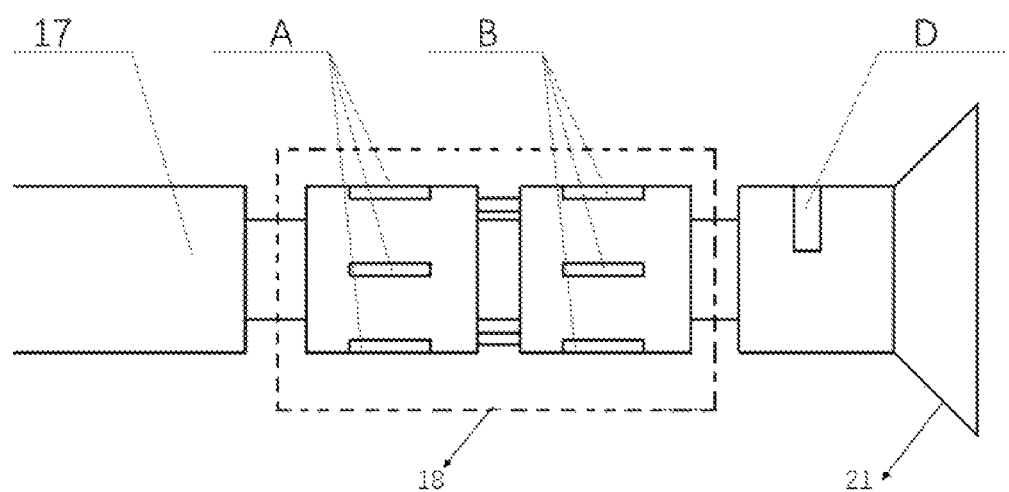
FIG. 8 is schematic diagram of a mounting position of the drilling traction robot.
Figure 9:
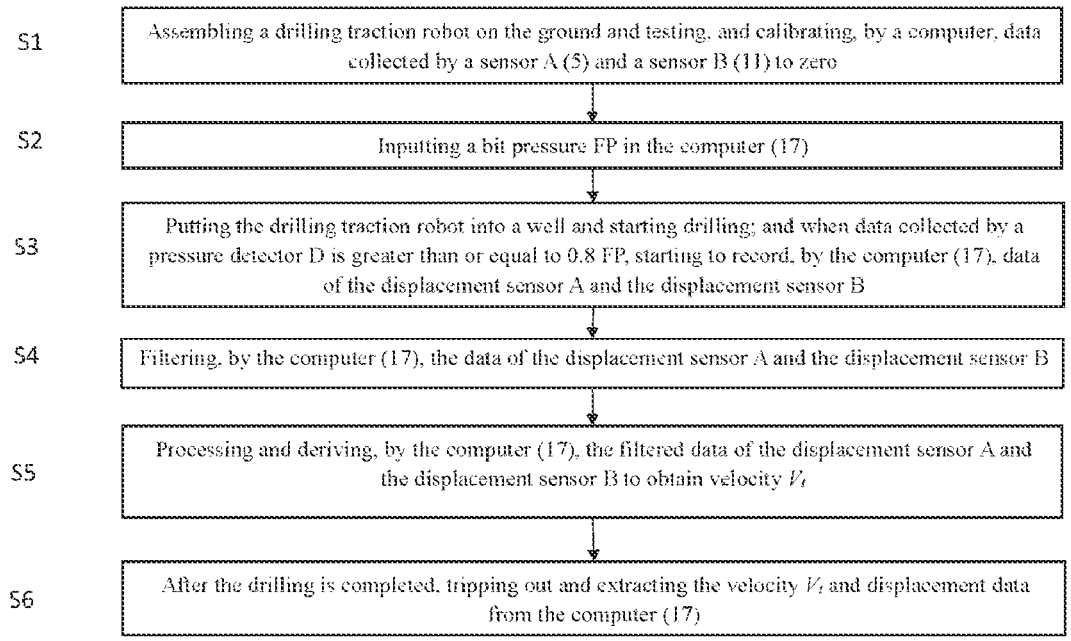
FIG. 9 is a flow chart of velocity measurement of the drilling traction robot.
Figure 10:
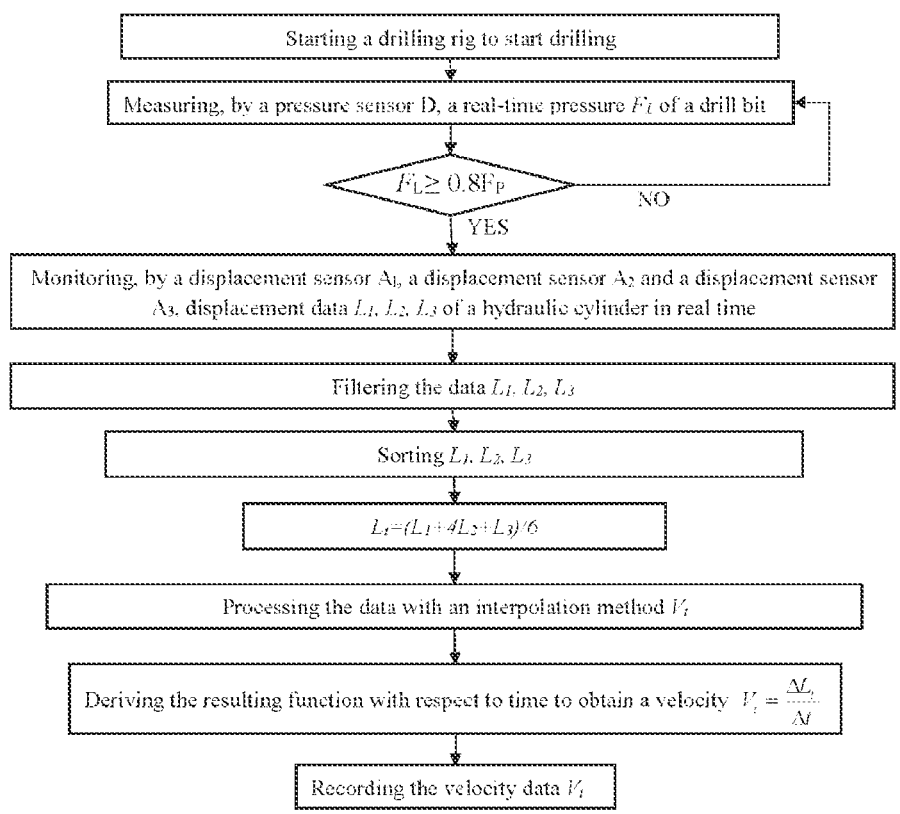
FIG. 10 is a detailed flow chart for calculating a movement velocity $V_{tA}$ of a piston (4) and a velocity $V_{tB}$ of a piston (10) in FIG. 7.
Figure 11:
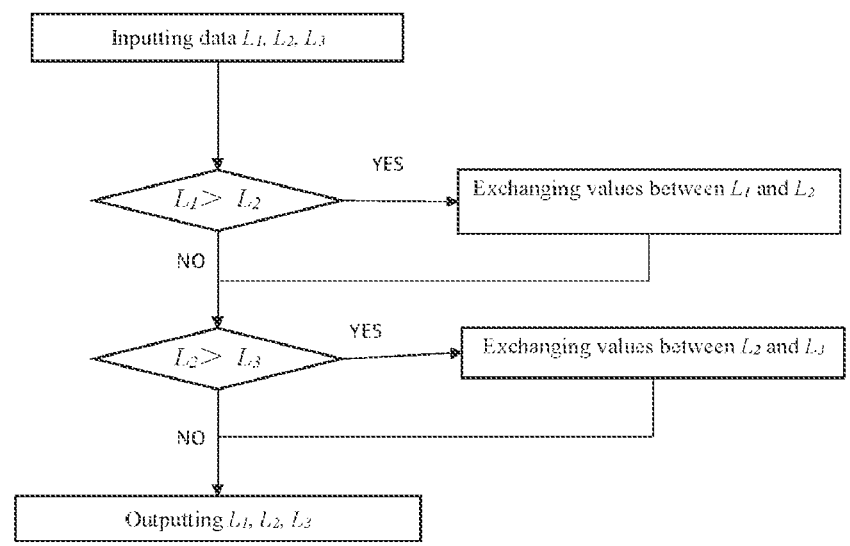
FIG. 11 is a detailed flow chart of a sorting program of a computer (17).

FIGS. 7 and 8 show a specific flow for processing the data of the displacement sensor A (5) and the displacement sensor B (11) by the computer (17).

What is claimed is:

1. A displacement measuring device of a drilling traction robot, comprising a support bar, a stopper, a hydraulic A, a hydraulic B, a piston of the hydraulic A, a piston of the hydraulic B, a displacement sensor A, a displacement sensor B, a seal baffle A, a seal baffle B, a waveguide, a waveguide B, a magnetic ring A, a magnetic ring B, a magnetic ring support plate A, a magnetic ring support plate B, a computer and a drilling traction robot, wherein:

the hydraulic A, the hydraulic B, the piston of the hydraulic A and the piston of the hydraulic B are coaxially mounted on the support bar; the piston of the hydraulic A is mounted in a cavity a between the hydraulic A and the support bar; and the piston of the hydraulic B is mounted in a cavity b between the hydraulic B and the support bar, wherein the piston of the hydraulic B is fixedly connected with the support bar;

the magnetic ring A and the magnetic ring support plate A are fixedly connected through a screw, wherein the magnetic ring support plate A is fixedly connected with the hydraulic A through a screw; the seal baffle A is connected with the displacement sensor A through a thread, wherein the seal baffle A and the piston of the hydraulic A are fixed through a glue stick; and the stopper is mounted in a thread mode at a motion limiting position of the piston of the hydraulic A to realize a displacement measuring function between the hydraulic A and the piston of the hydraulic A; and the magnetic ring B and the magnetic ring support plate B are fixedly connected through a screw, wherein the magnetic ring support plate B is fixedly connected with the hydraulic B through a screw; and the seal baffle is connected with the displacement sensor B through a thread, wherein the seal baffle B and the piston of the hydraulic B are fixed through a glue stick to realize a travelling displacement measuring function of the robot between the hydraulic B and the piston of the hydraulic B.

2. The displacement measuring device of the drilling traction robot according to claim 1, wherein two to four mounting groove which are uniformly distributed in a circumferential direction are arranged on inner cylinder walls of the hydraulic A and the hydraulic B.

3. The displacement measuring device of the drilling traction robot according to claim 1, wherein a countersunk hole is milled on the magnetic ring support plate A and the magnetic ring support plate B, a through hole is arranged at a center of the countersunk hole, and two to four threaded holes are uniformly and circumferentially arranged along an outside radial direction of the through hole.

4. The displacement measuring device of the drilling traction robot according to claim 1, wherein the seal baffle A and the seal baffle B are both provided with a seal threaded hole at a center, and two to four axial symmetrical through holes are arranged in a radial direction.

5. The displacement measuring device of the drilling traction robot according to claim 1, wherein the piston of the hydraulic A and the piston of the hydraulic B are both provided with two to four circular countersunk holes which are axially symmetrical with a through hole in an external structure, a center of the circular countersunk hole is provided with a through hole, and two to four threaded holes which are uniformly distributed are arranged in a radial direction; and an inside of the piston of the hydraulic B is provided with an arc-shaped groove; and an axial long groove is arranged in the piston of the hydraulic A.

6. The displacement measuring device of the drilling traction robot according to claim 1, wherein a through hole is axially arranged in the support bar, and a through hole and a threaded hole are radially arranged in the support bar.

7. The displacement measuring device of the drilling traction robot according to claim 1, wherein the displacement sensor A and the displacement sensor B are both magnetic displacement sensors, the displacement sensor A is connected with the seal baffle A through a thread so as to be fixed on the piston of the hydraulic A, and the magnetic ring A of the displacement sensor A is fixed on the magnetic ring support plate A through a glue stick or a screw, the displacement sensor B is fixed on the seal baffle B through a thread so as to be fixed on the hydraulic piston of the hydraulic B, and the magnetic ring B of the displacement sensor B is fixed on the magnetic ring support plate B through a glue stick or a screw.

8. A speed measuring method of a drilling traction robot, comprising the following steps of:

S1: assembling a drilling traction robot on the ground and completing a test, and correcting, by a computer, data collected by a displacement sensor A and a displacement sensor B to zero;

S2: inputting a bit pressure $F_P$ in the computer;

S3: putting the drilling traction robot into a well and starting drilling when a pressure detector D detects that the drilling traction robot contacts a bottom of the well;

S4: starting to record, by the computer, filtered data $L_{A1}$, $L_{A2}$, $L_{A3}$ of the displacement sensor A and filtered data $L_{B1}$, $L_{B2}$, $L_{B3}$ of the displacement sensor B;

S5: filtering, by the computer, the filtered data $L_{A1}$, $L_{A2}$, $L_{A3}$ of the displacement sensor A and the filtered data $L_{B1}$, $L_{B2}$, $L_{B3}$ of the displacement sensor B;

S6: processing and deriving, by the computer, the filtered data $L_{A1}$, $L_{A2}$, $L_{A3}$ of the displacement sensor A and the filtered data $L_{B1}$, $L_{B2}$, $L_{B3}$ of the displacement sensor B to obtain speeds $V_{tA}$ and $V_{tB}$; and S7: after the drilling is completed, tripping out and extracting the speed and displacement data from the computer.

9. The speed measuring method of the drilling traction robot according to claim 8, wherein the collecting process of the pressure detector D comprises the following steps of:

S31: mounting the pressure detector D at a rear part of a drill bit, or a part fixedly connected with the drill bit; and S32: when the pressure data collected by the pressure detector D is continuously higher than a certain set value, deeming that the drill bit reaches the bottom of the well and starting drilling, which means to transmit a signal to the computer.

10. The speed measuring method of the drilling traction robot according to claim 8, wherein the displacement sensor A, and the displacement sensor B comprise the following technical features:

the displacement sensor A and the displacement sensor B are respectively provided with three positions which are axially symmetrical with a through hole;

when a hydraulic A begins to move, the hydraulic A is fixedly connected with a magnetic ring A to drive the magnetic ring A to move along a waveguide A, so that the displacement sensor A measures movement displacement data $L_{A1}$, $L_{A2}$, $L_{A3}$ of a piston A at an A part of the drilling traction robot; and when a hydraulic B begins to move, the hydraulic B is fixedly connected with a magnetic ring B to drive the magnetic ring B to move along a waveguide B, so that the displacement sensor B measures the filtered data $L_{B1}$, $L_{B2}$, $L_{B3}$ of a piston B at a B part of the drilling traction robot.

11. The speed measuring method of the drilling traction robot according to claim 8, comprising:

S61: sorting, by the computer, the filtered data $L_{A1}$, $L_{A2}$, $L_{A3}$ inputted from the displacement sensor A, and inputting the sorting result into a formula $L_t=(L_1+4L_2+L_3)/6$ to obtain a processed displacement data $L_{tA}$; sorting, by the computer, the filtered data $L_{B1}$, $L_{B2}$, $L_{B3}$ inputted from the displacement sensor B, and inputting the sorting result into a formula $L_t=(L_1+4L_2+L_3)/6$ to obtain a processed displacement data $L_{tB}$;

S62: performing, by the computer, continuous function interpolation processing on the processed displacement data $L_{tA}$ and the processed displacement data $L_{tB}$ by an interpolation method;

S63: performing, by the computer, derivation $$V_t = \frac{\Delta L_t}{\Delta t}$$

on the processed data $L_{tA}$ of the displacement sensor A to obtain the movement speed $V_{tA}$ of a piston A at a part A of the drilling traction robot; and S64: performing, by the computer, derivation $$V_t = \frac{\Delta L_t}{\Delta t}$$

on the processed data $L_{tB}$ of the displacement sensor B to obtain the movement speed $V_{tB}$ of a piston B at a B part of the drilling traction robot.

\* \* \* \* \*